(12) United States Patent
Noda et al.

(10) Patent No.: US 7,371,449 B2
(45) Date of Patent: May 13, 2008

(54) OPTICAL RECORDING MEDIUM

(75) Inventors: Yoshihiro Noda, Minato-ku (JP); Shigeyuki Furomoto, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 11/393,917

(22) Filed: Mar. 31, 2006

(65) Prior Publication Data
US 2006/0172109 A1   Aug. 3, 2006

Related U.S. Application Data

(63) Continuation of application No. PCT/JP2005/007649, filed on Apr. 21, 2005.

(30) Foreign Application Priority Data

| Apr. 23, 2004 | (JP) | ............................. 2004-128002 |
| Apr. 28, 2004 | (JP) | ............................. 2004-133826 |

(51) Int. Cl.
  *B32B 3/02* (2006.01)
(52) U.S. Cl. .................. 428/64.1; 428/64.4; 428/64.8; 430/270.14
(58) Field of Classification Search ............... 428/64.8, 428/64.1, 64.4; 430/270.14
See application file for complete search history.

(56) References Cited

U.S. PATENT DOCUMENTS

| 4,639,745 A | * | 1/1987 | Matsui et al. ............. 346/135.1 |
| 5,244,774 A | * | 9/1993 | Usami et al. ........... 430/270.14 |
| 6,168,843 B1 | * | 1/2001 | Kambe et al. ............. 428/64.1 |
| 2006/0114799 A1 | * | 6/2006 | Martens et al. ............. 369/125 |

FOREIGN PATENT DOCUMENTS

JP    2003/331463    11/2003

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

In an optical recording medium having two recording layers of a first recording layer and a second recording layer, the second recording layer contains metallized azo dyes represented by the following general formula (I) or (II), and recording characteristics of the second recording layer are improved by having optical density of 1.3 times as large as, or 1.3 times greater than, that of a dye contained in the first recording layer.

[Formula 1]

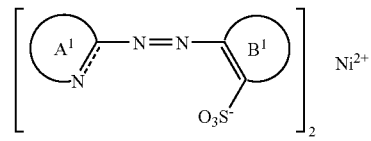

(I)

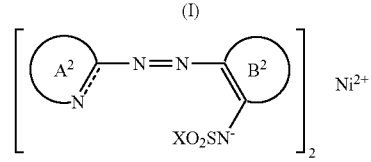

(II)

(In this regard, rings A1 and A2 are nitrogen-containing heteroaromatic rings, rings B1 and B2 are aromatic rings, and X is alkyl group substituted by at least two fluorine atoms).

11 Claims, 5 Drawing Sheets

FIG.2A 203 first reflective layer
202 first recording layer
201 first substrate

FIG.2B 204a ultraviolet curable resin layer
203
202
201

FIG.2C ultraviolet rays
210 resin stamper

204 intermediate layer
203
202
201

FIG.2D

205 second recording layer
204
203
202
201

FIG.2E

206 second reflective layer
205
204
203
202
201

FIG.2F 208 second substrate
207 adhesive layer
206
205
204
203
202
201

FIG.3

FIG.4 optical density of the second recording layer dye/
optical density of the first recording layer dye

OPTICAL RECORDING MEDIUM

TECHNICAL FIELD

The present invention relates to an optical recording medium, and more specifically an optical recording medium having at least two recording layers.

BACKGROUND ART

Recently, since a large volume of information can be stored and random access is easy, various types of optical recording media such as CD-Rs, CD-RWs, MOs, are widely recognized and gains popularity as an external recording storage in an information processing apparatus such as computers. Among the various types of the optical recording media, optical recording media such as CD-Rs, DVD-Rs, and DVD+Rs having a recording layer containing organic dyes are relatively low in price, and have compatibility with a playback-only optical disc, thereby being popularly used in particular. For example, a typical CD-R, or the like, having recording layers containing organic dyes, has a dye-containing recording layer and a reflective layer on a transparent disc substrate in this order, and has a laminated structure having a protective layer to cover the recording layer and the reflective layer on which recording/reading are carried out by laser light through the substrate.

As one of means for further increasing the volume of storage capacity of these optical recording media, there can be included a medium that is provided with a plurality of recording layers, for example, a dual layer. In this case, from the viewpoint of convenience, the dual layer is required to be made in such a manner that recording/reading can be carried out from one side of the two recording layers. In order to respond to the requirement, the applicant of the present invention has been applied for a patent regarding an optical recording medium including a first recording layer containing a dye, a first translucent reflective layer, an intermediate resin layer, a second recording layer containing a dye, a second reflective layer, an adhesive layer, and a second substrate, on a first disk-shape transparent substrate, in this order (patent document 1). With this, recording information on the first recording layer and the second recording layer become possible from one side of the optical recording medium having two recording layers, and also, as the dual-layer type optical recording medium, reading signals from the one side becomes possible at the time of reading.

[Patent document 1] Japanese Laid-open Patent Application No. 2003-331463

DISCLOSURE OF THE INVENTION

Problems to be Solved by the Invention

In a case where information is recorded on the optical recording medium having two recording layers disclosed in the patent document 1, power of incident light beam from the first substrate side is scattered into two directions due to the first translucent reflective layer, or the like, and distributed for recording on the first and second recording layers. Therefore, there is a problem in that recording characteristics are easily deteriorated in the second recording layer since recording of information is carried out by the half-powered light beam.

The present invention has been made to solve the problem that is caused when the recording characteristics of the optical recording medium having two recording layers are considered.

Accordingly, an object of the present invention is to provide an optical recording medium in which recording characteristics of a second recording layer is improved.

Means for Solving the Problem

To solve the above-described problem, in the present invention, dyes having high sensitivity to incident light are used in the second recording layer.

In other words, according to the present invention, there is provided an optical recording medium including a first recording layer capable of recording/reading information by light, and at least one second recording layer, characterized in that optical density of a dye contained in the second recording layer is set greater than that of a dye contained in the first recording layer which is the closest to the light incident side.

In this way, in an optical recording medium to which the present invention is applied, a sensitivity difference caused between the first recording layer and the second recording layer can be kept within an appropriate range by which the optical density of the dye contained in the second recording layer is set greater than that of the dye contained in the first recording layer.

As for an appropriate range of the sensitivity difference caused between the first recording layer and the second recording layer, it is preferable that recording power ratio (recording power of the second recording layer/recording power of the first recording layer) obtained by a measurement method, which is described later in detail in "Experiments", be 0.7 or greater and smaller than 1.16. By setting the sensitivity difference within the above range, recording can be carried out without an excessive adjustment to recording conditions in the first and second recording layers. As a result, a satisfactory jitter characteristic can be obtained for these recording layers.

Here, it is preferable that the optical density of the dye contained in the second recording layer be 0.005 or greater and 0.015 or smaller. By containing the dye of which optical density for the light irradiated to the optical recording medium is within the above-described range, sensitivity of the second recording layer to laser light can be sufficiently improved, and decrease of reflectivity can be suppressed.

In addition, it is preferable that the optical density of the dye contained in the second recording layer be 1.3 times as large as, or 1.3 times greater than, that of the dye contained in the first recording layer.

In addition, in the optical recording medium to which the present invention is applied, it is preferable that a thickness of the second recording layer be 50 nm or greater and 200 nm or smaller.

Furthermore, it is preferable that a thickness of a translucent reflective layer provided between the first recording layer and the second recording layer be 5 nm or greater and 50 nm or smaller.

In addition, light wavelength used for recording information on the optical recording medium to which the present invention is applied and reading the recorded information is from 350 nm to 900 nm.

In the optical recording medium to which the present invention is applied, it is preferable that the dye contained in the second recording layer be selected from metallized azo dyes represented by the following general formula (I) and/or general formula (II). These metallized azo dyes are preferred due to their superiority of recording sensitivity, durability and light stability.

(In this regard, rings A1 and A2 are nitrogen-containing heteroaromatic rings that may respectively have independent substituents, rings B1 and B2 are aromatic rings that may respectively have independent substituents, and X is an alkyl group with carbon numbers 1 to 6 substituted by at least two fluorine atoms.)

Further, it is preferable that refractive index of the dye contained in the second recording layer be 1.0 or greater, and also preferable that an extinction coefficient against the irradiated light be 0.5 or smaller.

In addition, according to the present invention, there is provided the optical recording medium having two recording layers, characterized in that the second recording layer contains a nickel azo dye having a greater optical density than the optical density in recording light of the dye contained in the first recording layer so that a ratio of (P2)/(P1) can be less than 1.16, the P1 being a recording power to record information in the first recording layer provided on the side where the recording light is made incident, and the P2 being a recording power to record information in the second recording layer provided on the side distant from the side where the recording light is made incident.

Here, it is preferable that the optical density of the nickel azo dye contained in the second recording layer be 1.05 times as large as, or 1.05 times greater than, that of the dye contained in the first recording layer.

It should be noted that the optical density (OD) is obtained by the following relational expression (absorption spectrum) by which chloroform solution of a dye used for the recording layer or methanol solution (density of 5 mg/l) is respectively admitted into a cell of optical path length of 10 mm, and transmitted light intensity ($I_1$) is measured in the range of wavelength from 800 nm to 400 nm in use of an absorption spectrometer. In practice, a measured value of the optical density relative to the wavelength can be obtained while the wavelength is scanned by a spectrophotometer.

$$OD = I_{abs} = -\log(I_1/I_0)$$

(In this regard, $I_0$ is incident light intensity, $I_1$ is transmitted light intensity, and a base of logarithm is 10.)

It should be noted that the optical density of the above dye can be obtained by the following method in a case where a dye formation is not an isolation matter (pure dye) such as crystal and powder.

For example, in a case where a dye having unknown optical density is contained in respective recording layers of the dual-layer disc bonded by the adhesive layer, cutter edge is inserted from the edge of the dual-layer disc into the adhesive layer so as to split it into two discs. Next, a portion equivalent to the first recording layer and a portion equivalent to the second recording layer are further separated to isolate, and the respective recording layers are separately cleaned by ethanol, or the like, to flush out the dyes contained in the recording layers (this operation is herein referred to as ethanol cleaning). Next, each of the ethanol cleaning solutions in which the dye is dissolved or dispersed is separately gathered in different containers. In the following, ethanol in the solution is removed by distillation, or the like, and a dye as a solid material, that is, a dye contained in the first recording layer and a dye contained in the second recording layer are separately obtained. In order to securely obtain dye volumes such that the optical density can be measured, it is preferable that a dye be extracted from a plurality of dual-layer discs.

It should be noted that solvent is adjusted so that (dye volume)/(solvent volume) becomes 5 mg/l in a case where the volume of the dye for measuring the optical density is less than 5 mg. For example, in a case where the dye is 1 mg, 200 ml of the solvent is used.

In addition, the optical density of the dye is set as optical density in recording/reading light wavelength in the absorption spectrum obtained as above.

However, for example, in a case where the optical density of the dye contained in the first recording layer, or the optical density of the dye contained in the second recording layer is less than 0.003, a measurement of correct optical density is tend to be difficult since influence of noise such as light source is included in a measured value of the optical density.

In this case, it is preferable that the optical density of the dye be obtained by the following method. First, a dye having smaller optical density is determined in comparison between the optical density of the dye contained in the first recording layer and the optical density of the dye contained in the second recording layer in the recording/reading light wavelength. Next, in wavelength shorter than the recording/reading light wavelength, such wavelength, at which the optical density of the dye having the above-described smaller optical density of 0.003, is found, and in the following, the optical density of the other dye (the dye having the greater optical density) in the wavelength is obtained. In other words, in this case, the optical density of the dye having the smaller optical density in the recording/reading light wavelength is 0.003, and the optical density of the other dye having the greater optical density in the recording/reading light wavelength becomes 0.003 or greater.

In addition, as an organic solvent used for measuring the optical density, chloroform, methanol, or the like is preferable. In addition, the organic solvent is not particularly limited as long as it is an organic solvent capable of dissolving dyes, but a polar solvent is not preferable since there is a possibility that absorption spectrum can not be correctly measured due to the fact that the polar solvent often affects coordinate bonds of metal complex compounds.

It should be noted that, in this specification, the optical density of the dye contained in the first recording layer is sometimes referred to as the optical density of a first recording layer dye, and the optical density of the dye contained in the second recording layer is sometimes referred to as the optical density of a second recording layer dye.

EFFECT OF THE INVENTION

According to the present invention, an optical recording medium in which recording characteristics of a second recording layer is improved, can be obtained.

BEST MODE FOR CARRYING OUT THE INVENTION

Detailed descriptions of the best mode (hereinafter, an embodiment) for carrying out the present invention will be given below by referring the accompanying drawings. However, the present invention is not intended to limit to embodiments described below, but various modifications can be conceived within the range of the gist of the invention. In addition, the drawings are used for describing the embodiments, and do not show actual sizes.

Optical Recording Medium

Figure 1:
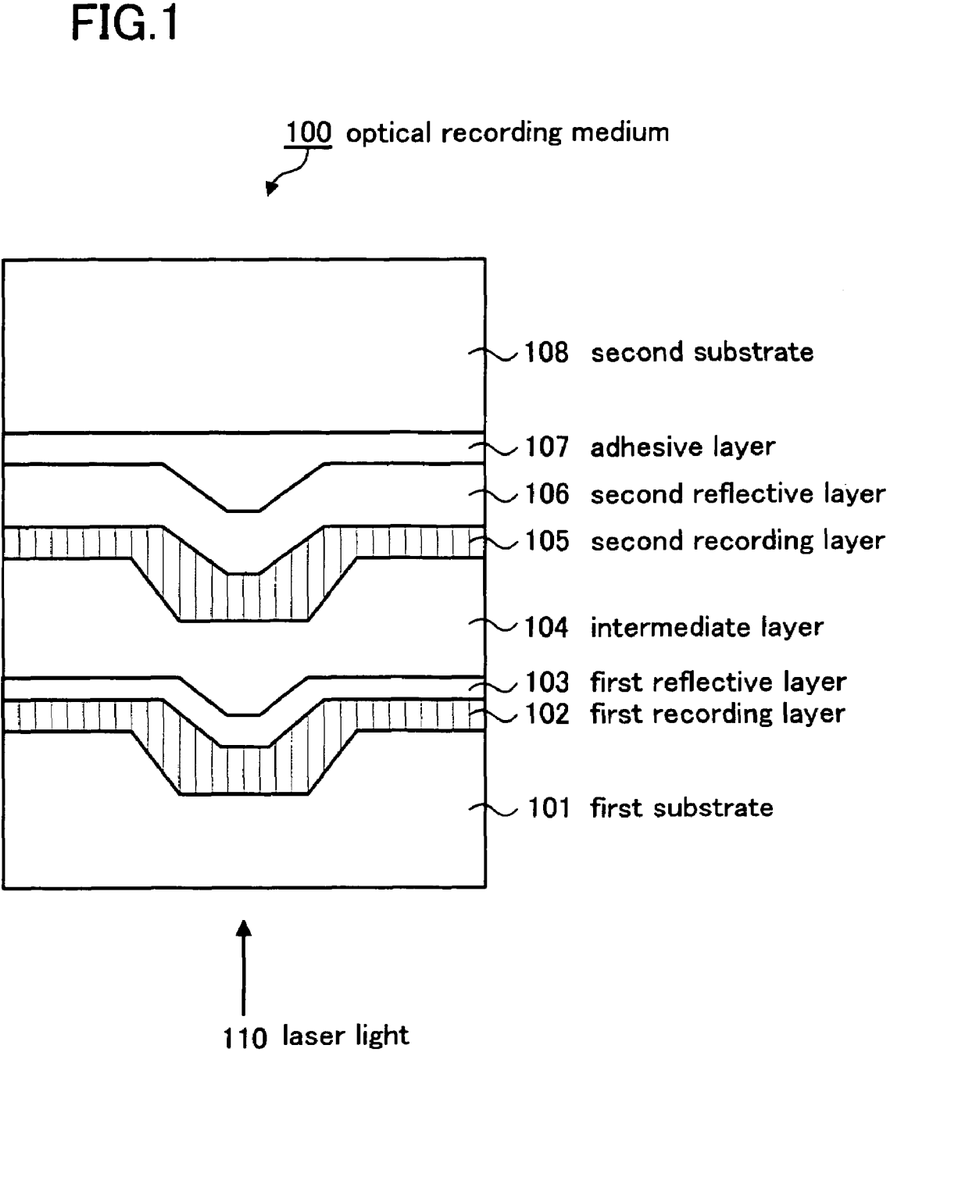
FIG. 1 is a diagram showing an example of an optical recording medium to which the present embodiment is applied.

FIG. 1 is a diagram showing an example of an optical recording medium to which the present embodiment is applied. An optical recording medium 100 shown in FIG. 1 has a configuration that is sequentially laminated by a disc-shaped and light transmitting first substrate 101, on the first substrate, a first recording layer 102 containing a dye on which recording/reading information are carried out by laser light 110 irradiated via the first substrate 101, a translucent first reflective layer 103 for distributing the power of incident laser light 110 from the first substrate 101 side, an intermediate layer 104 configured of a optically transparent material, a second recording layer 105 containing a dye having higher sensitivity than that of a dye contained in the first recording layer 102, a second reflective layer 106 reflecting the laser light 110 transmitted the second recording layer 105, an adhesive layer 107, a second substrate 108 serving as a dummy substrate forming the outermost layer.

As shown in FIG. 1, optical information is recorded in the dye containing first recording layer 102 by the laser light 110 irradiated from the side of the first substrate 101 of the optical recording medium 100, and reading the recorded optical information is carried out. Further, one part of the laser light 110 transmits the translucent first reflective layer 103 and irradiated to the dye containing second recording layer 105 via the intermediate layer 104, thereby recording/reading the optical information is carried out similarly to the first recording layer 102.

The part of the laser light 110 reflected by the first reflective layer 103 and the part of the laser light 110 reflected by the second reflective layer 106 are respectively used for focusing (not shown in the figure) to condense the laser light 110. In addition, the second substrate 108 serving as the dummy substrate is laminated on the second reflective layer 106 by the adhesive layer 107 so as to form the outermost layer of the optical recording layer 100 in addition to add rigidity to the optical recording medium 100 and maintain the stability of the form. Further, concavity and convexity is formed on the first substrate 101 and the intermediate layer 104, respectively, to form recording tracks.

Here, in the optical recording medium 100 to which the present embodiment is applied, "optical transparency (or transparence)" means optical transparency relative to the light wavelength irradiated to the dye containing first recording layer 102 and the dye containing second recording layer 105 so as to record/read the optical information, and specifically, it means that the optical transparency of the light wavelength for recording/reading is 50% or greater, and more preferably, 60% or greater.

As for the two recording layers (the first recording layer 102 and the second recording layer 105) in the optical recording medium 100 to which the present embodiment is applied, dye compounds having the maximum absorption wavelength λmax in the range of visible radiation to near infrared region of approximately from 350 nm to 900 nm, and suitable for recording by blue to near microwave laser, are used. The dyes used for the first recording layer 102 or the second recording layer 105 can include, for example, macrocyclic azaannulene dyes (phthalocyanine dye, naphthalocyanine dye, porphyrin dye, or the like), pyrromethene dyes, polymethine dyes (cyanine dye, merocyannine dye, suqualilium dye, or the like), anthraquinone dyes, azurenium dyes, metallized azo dyes, metallized indoaniline dyes, or the like.

In the second recording layer 105 in the optical recording medium 100 to which the present embodiment is applied, the optical density in the recording wavelength of the laser light 110 irradiated from the first substrate 101 side is generally 0.005 or greater, preferably 0.006 or greater, and more preferably 0.0065 or greater. However, the dye is generally needed to have the optical density of 0.015 or smaller, preferably 0.013 or smaller, and more preferably 0.012 or smaller. When the optical density of the dye used for the second recording layer 105 is within the above range, the sensitivity of the second recording layer 105 relative to the laser light 110 can be sufficiently improved, and deterioration of the reflectivity caused by excessive absorption of the laser light 110 can be suppressed.

In addition, in the optical recording medium 100 to which the present embodiment is applied, the optical density of the dye used for the second recording layer 105 is set greater than that of the dye used for the first recording layer 102. Specifically, the optical density of the dye used for the second recording layer 105 is generally 1.05 times or greater, preferably 1.1 times or greater, more preferably 1.2 times or greater, and much more preferably 1.3 times or greater, relative to the optical density of the dye used for the first recording layer 102. However, it is preferable to be 4 times or smaller, more preferably 3.5 or smaller, and more preferably 3.2 or smaller. When the relation between the optical density of the dye used for the second recording layer

105 and the optical density of the dye used for the first recording layer 102 is within the above range, sensitivity difference caused between the first recording layer 102 and the second recording layer 105 can be within an appropriate range, and the deterioration of reflectivity can be further suppressed.

Among the dyes used for the second recording layer 105, the metallized azo dyes are preferable due to their superiority of recording sensitivity, durability, and light stability. Such a metallized azo dyes can particularly include compounds represented by the following general formula (I) and/or general formula (II).

(In this regard, rings A1 and A2 are nitrogen-containing heteroaromatic rings that can respectively have independent substituents, rings B1 and B2 are aromatic rings that can respectively have independent substituents, and X is an alkyl group with carbon numbers 1 to 6 substituted by at least two fluorine atoms.)

Further, among the compounds represented by the general formula (I) and/or general formula (II), the compounds represented by the general formula (II) is particularly preferred, and the following compounds can be listed as specified compounds represented as follows.

It should be noted that the optical density of the dye to be used is not necessarily achieved by a single kind of dye, but a plurality of kinds of dyes can be used as mixture thereof. For example, it is possible that the dyes having high optical density and the dyes having low optical density are mixed, and the ratio therebetween is adjusted so as to be in the range of the present invention.

In addition, the refractive index (the refractive index relative to the wavelength of recording light or reading light) of the dyes used for the second recording layer 105 is generally 1.00 or greater, and preferably 1.50 or greater, but generally 3.00 or smaller.

Further, the extinction coefficient (the extinction coefficient relative to the wavelength of recording light or reading light) of the dyes used for the second recording layer 105 is generally 0.50 or smaller, preferably 0.30 or smaller, but generally 0.001 or greater. If the extinction coefficient is excessively great, there is a tendency that the absorption of the recording light or the reading light increases and the reflectivity decreases in the second recording layer 105, thereby it is not preferred. In addition, if the extinction coefficient is excessively small, the absorption of the recording light or the reading light decreases in the second recording layer 105, thereby it is not preferred.

A thickness of the second recording layer 105 is generally 50 nm or greater, preferably 60 nm or greater, but generally 200 nm or smaller, preferably 150 nm or smaller, and more preferably 100 nm or smaller. If the thickness of the second recording layer 105 is excessively great, the sensitivity decreases, thereby it is not preferred. In addition, if the thickness of the second recording layer 105 is excessively small, signal amplitude can not be sufficiently obtained, thereby it is not preferred. Here, the thickness of the second recording layer 105 generally means a film thickness in a thick film portion.

It should be noted that the film thickness of the first recording layer 102 is not particularly limited since a suitable film thickness varies depending on a recording method, or the like. However, to obtain sufficient modulation amplitude, the thickness of the first recording layer 102 is generally 20 nm or greater, preferably 30 nm or greater, and particularly preferably 40 nm or greater. However, since light has to be transmitted, it is generally 200 nm or smaller, preferably 180 nm or smaller, and more preferably 150 nm or smaller.

In addition, in the present embodiment, according to the above-described reasons, the dyes used for the first recording layer 102 have the optical density in the recording wavelength of the laser light 110 irradiated from the first substrate 101 side, which is generally 0.003 or greater, preferably 0.0035 or greater, more preferably 0.004 or greater, preferably 0.0045 or greater, and more preferably 0.005 or greater. However, the optical density is generally 0.0115 or smaller, preferably 0.01 or smaller, and more preferably 0.009 or smaller.

In the optical recording medium 100 to which the present embodiment is applied, in the two recording layers (the first recording layer 102 and the second recording layer 105), in order to improve the stability and light stability of the recording layers, as singlet oxygen quencher, transition metal chelate compounds (for example, acetylacetonato-chelate, bisphenyl dithiole, salicylaldehyde oxime, bis-dithio-α-diketone, or the like), or the like may be contained, and in order to improve the recording sensitivity, recording sensitivity improvers such as metal compounds may be contained. Here, the metal compounds mean metals such as transition metals contained in compounds in a form of atoms, ions, clusters, or the like. For example, organic metal compounds such as ethylenediamine type complex, azomethine type complex, phenylhydroxyamine type complex, phenanthroline type complex, dihydroxyazobenzene type complex, dioxime type complex, nitrosoaminophenol type complex, pyridyltriazine type complex, acetylacetonato-type complex, metallocene type complex, and porphyrin type complex can be listed. A metal atom is not particularly limited, but a transition metal is preferred.

In addition, in the two recording layers (the first recording layer 102 and the second recording layer 105), binders, leveling agents, anti-forming agents, or the like, can be used in combination if necessary. Preferred binders can include polyvinyl alcohol, polyvinylpyrrolidone, nitrocellulose, cellulose acetate, ketone resin, acryl resin, polystyrene resin, urethane resin, polyvinyl butyral, polycarbonate, polyolefin, or the like.

A method of depositing a film of the first recording layer 102 and the second recording layer 105 can include a vacuum vapor deposition method, a sputtering method, a doctor blade method, a cast method, a spin-coat method, an immersion method, or the like as thin film forming methods which are generally used. From a viewpoint of mass-production and cost, wet film forming methods such as the spin-coat method are preferred. In addition, from a viewpoint of obtaining even recording layers, the vacuum vapor deposition method is preferred.

In a case where the film is formed by the spin-coat method, revolving speed is preferably from 10 rpm to 15000 rpm. After the spin coating, heat treatment is generally carried out to remove the solvent. In the case where the recording layer is formed by coating methods such as the doctor blade method, the cast method, the spin-coat method, the immersion method, coating solvents are not particularly limited as long as the solvents do not affect the substrate. For example, it can be included that ketone alcohol solvents such as diacetone alcohol and 3-hydroxy-3-methyl-2-butanone; cellosolve solvents such as methyl cellosolve and ethyl cellosolve; chain hydrocarbon solvents such as n-hexane and n-octane; cyclic hydrocarbon solvents such as cyclohexane, methylcyclohexane, ethylcyclohexane, dimethylcyclohexane, n-butylcyclohexane, tert-butylcyclohexane, and cyclooctane; perfluoroalkyl alcohol solvents such as tetrafluoropropanol, octafluoropentanol, and hexafluorobutanol; hydroxycarboxylic acid ester solvents such as methyl lactate, ethyl lactate, and 2-hydroxyisobutyric acid methyl.

The heat treatment for removing these solvents is generally carried out at the slightly lower temperature, which is generally in a range from 60° C. to 100° C., than the boiling points of the solvents used from the viewpoint of removing the solvents and carrying out the operation by simple and easy facility. In addition, a method of the heat processing is not particularly limited, but can include, for example, a method in which the film is deposited by applying the dye-containing solution for forming the first recording layer 102 on the first substrate 101, and then, the film is held at a predetermined temperature for a predetermined period (generally 5 minutes or longer, and preferably 10 minutes or longer, but 30 minutes or shorter, and preferably 20 minutes or shorter). In addition, a method of heating the first substrate 101 by irradiating infrared radiation and far-infrared radiation for a short period (for example, for 5 seconds to 5 minutes) is also possible.

In the case of the vacuum vapor deposition method, for example, the recording layer components such as organic dyes and various kinds of additive agents, if necessary, are admitted into a crucible provided in the vacuum container, and the inside of the vacuum container is evacuated by the vacuum pump to the level of approximately $10^{-2}$ Pa to $10^{-5}$ Pa. Thereafter, the crucible is heated to evaporate the recording layer components and to deposit them on the substrate placed in face with the crucible.

Next, other layers forming the optical recording medium 100 to which the present embodiment is applied will be described.

(First Substrate)

A first substrate 101 has optical transparency and excellent light characteristics in that birefringent index is small, or the like, and is configured of materials excellent in formability in that injection molding is easy, or the like. Further, it is preferable that hygroscopicity be small. Further, it is also preferable that morphological stability be provided so that the optical recording medium 100 can have a certain level of rigidity. The materials constituting the first substrate 101 are not particularly limited, but can include, for example, acryl resin, methacryl resin, polycarbonate resin, polyolefin resin (particularly, amorphous polyolefin), polyester resin, polystyrene resin, epoxy resin, glass, or the like. In addition, such materials as glass, or the like, on which the resin layers are formed of radiation curable resins can be also used. Among these materials, polycarbonate is preferable from the viewpoints of light characteristics, high productivity such as formability, cost, low hygroscopicity, morphological stability, or the like. In addition, amorphous polyolefin is preferable from the viewpoints of chemical resistance, low hygroscopicity, or the like. In addition, glass substrate is preferable from the viewpoint of high-speed response, or the like.

A thickness of the first substrate 101 is generally 2 mm or smaller, and preferably 1 mm or smaller. Since there is a tendency in that coma aberration is small as the distance between objective lens and the recording layers is small and the substrate is thin. Therefore, it is easy to increase the recording density. However, to obtain sufficient light characteristics, hygroscopicity, formability, and morphological stability, it is generally 10 μm or greater and preferably 30 μm or greater.

It should be noted that grooves having a predetermined width and depth are formed on the surface of the first substrate 101.

In a case where the optical recording medium 100 to which the present embodiment is applied is recorded/read by the light wavelength used for Digital Versatile Discs (DVDs), this groove width and groove depth are formed in the well-known range for DVD±R. Specifically, the groove depth is preferred to be 60 nm or greater, more preferably 80 nm or greater, and further preferably 100 nm or greater. However, it is preferable to be 300 nm or smaller, more preferably 270 nm or smaller, and more preferably 200 nm or smaller. The groove width is generally 0.074 μm or greater, preferably 0.148 μm or greater, more preferably 0.222 μm or greater. However, it is generally 0.666 μm or smaller, preferably 0.592 μm or smaller, and more preferably 0.518 or smaller.

(First Reflective Layer)

It is required for a first reflective layer 103 that absorption of recording/reading light be small, light transmittance be 40% or greater, and generally have appropriate light reflectivity of 30% or greater. For example, appropriate transmittance can be achieved by thinly providing metals with high reflectivity. In addition, it is preferable to have a certain level of corrosion resistance. Further, it is preferable to have barrier properties so that the first recording layer 102 is not affected by penetration of the other compounds from an upper layer (here, an intermediate layer 104) of the first reflective layer 103.

A thickness of the first reflective layer 103 is generally 50 nm or smaller, preferably 30 nm or smaller, and more preferably 25 nm or smaller in order to achieve the light transmittance of 40% or greater. However, in order that the first recording layer 102 is not affected by the upper layer of the first reflective layer 103, it is generally 3 nm or greater, and preferably 5 nm or greater.

Materials forming the first reflective layer 103 are not particularly limited, but the material having an appropriately high reflectivity relative to the wavelength in the reading light is preferable. For example, metals such as Au, Al, Ag, Cu, Ti, Cr, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi, and rear-earth metals, and semimetals are possible to be used individually, or can be used as alloyed metals. Among these metals, Au, Al, and Ag are suitable for the materials of the first reflective layer 103 since the reflectivity is high. In addition, the metal materials containing 50% or greater of Ag is particularly preferred in terms of low cost and high reflectivity.

If the film thickness of the first reflective layer 103 is thin and crystal grains of the film are large, reading noise is caused. Therefore, it is preferable to use the materials having small crystal grains. Since pure silver has a tendency of having large crystal grains, Ag is preferable to be used as an alloyed metal. Among these metals, it is preferable to contain 0.1 atom % to 15 atom % of at least a kind of element selected from the group consisted of Ag, as a main component, Ti, Zn, Cu, Pd, Au, and rear-earth metals. In a case where two kinds or more of Ti, Zn, Cu, Pd, Au and rear-earth metals are contained, each element can be 0.1 atom % to 15 atom %, but the total is preferably 0.1 atom % to 15 atom %.

Particularly preferred alloy composition contains 0.1 atom % to 15 atom % of at least a kind of element selected from the group consisted of Ag, as the main component, Ti, Zn, Cu, Pd, and Au, and, if necessary, 0.1 atom % to 15 atom % of at least a kind of rear-earth elements. Among the rear-earth metals, neodymium is particularly preferred. Specifically, AgPdCu, AgCuAu, AgCuAuNd, AgCuNd, or the like, are included.

As the first reflective layer 103, a layer consisted of only Au is suitable since it has a small crystal grains and excellent in corrosion resistance. In addition, as the first reflective layer 103, a layer formed of Si is also possible to be used. Further, it is also possible that, by using materials other than metals, thin film of low refractivity and thin film of high refractivity are alternately laminated to form multilayered film so as to be used as a reflective layer.

A formation method of the first reflective layer 103 can include, for example, a spattering method, an ion plating method, a chemical vapor deposition method, a vacuum vapor deposition method, or the like. In addition, in order to improve the reflectivity, recording characteristics, adhesion, or the like, an intermediate layer and an adhesive layer formed of well-known inorganic or organic materials can be provided between the first substrate 101 and the first recording layer 102, and the first recording layer 102 and the first reflective layer 103.

(Intermediate Layer)

A resin forming an intermediate layer 104 is needed to have optical transparency and be capable of forming grooves and pits by concavity and convexity. In addition, it is preferable that adhesive force be high, and cure shrinkage at the time of curing adhesion is generally 15% or smaller and preferably 10% or smaller so that warpage can be suppressed at the time of forming the intermediate layer 104, and morphological stability of the optical recording medium 100 can be increased. In addition, a film thickness of the intermediate layer 104 is generally needed to be 5 µm or greater, and preferably 10 µm or greater, but 100 µm or less is preferable. In addition, the intermediate layer 104 is not necessarily formed by a single layer, but can be formed as plural layers.

In the intermediate layer 104, concavity and convexity is provided spirally or concentrically to form grooves and lands. In general, by using these grooves and/or lands as recording tracks, recording/reading information is carried out in the second recording layer 105. The width of the grooves is generally approximately from 50 nm to 500 nm, and the depth of the grooves is generally approximately from 10 nm to 250 nm. In addition, in a case where the recording track is spiral, the preferable track pitch is approximately from 0.1 µm to 2.0 µm. In addition to this, if necessary, it is possible to have the concavity and convexity pit such as land pre-pit. From the viewpoint of cost, these concavity and convexity are manufactured by a 2P method (Photo Polymerization method) in a manner that the concavity and convexity are transferred from resin stamper having concavity and convexity to curable resins such as an optical curable resin, and are cured.

Materials forming the intermediate layer 104 can include, for example, a thermoplastic resin, a thermosetting resin, an electron beam curable resin, an ultraviolet curable resin (including a delayed curing type), or the like. Dissolved in appropriate solvents to prepare coating liquid, a thermoplastic resin, a thermosetting resin, or the like, can be formed by coating and drying (heating) the coating liquid. After preparing coating liquid by the ultraviolet curable resin itself or being dissolved in appropriate solvents, the ultraviolet curable resin can be formed by coating the coating liquid and being irradiated with ultraviolet ray to be cured. These materials can be used singularly or by mixture. Further, it can be used as multi-layers.

Coating methods include methods such as a spin coat method and a cast method. Among these, the spin coat method is preferred. A resin having high viscosity can be formed by coating by way of screen printing, or the like. From the viewpoint of productivity, the preferred ultraviolet curable resin is liquid at the temperatures from 20° C. to 40° C. since coating can be carried out without solvents. In addition, it is preferable that the ultraviolet curable resin is prepared to have the viscosity of 20 mPa·s to 1000 mPa·s.

Among the materials of the intermediate layer 104, the ultraviolet curable resins are preferable in that transparency is high and curing time is short, thereby advantageous in production. The ultraviolet curable resins can include a radical ultraviolet curable resin and a cation ultraviolet curable resin, and both of them can be used. The radical ultraviolet curable resin uses compositions including an ultraviolet ray curable compound and a photo polymerization initiator as essential components. As for the ultraviolet curable compounds, monofunctional (meth)acrylates and multifunctional (meth) acrylates can be used as a polymerization monomer component. Each of them can be used singularly or by mixture of two or more kinds. Here, both of acrylates and metaacrylate are both referred to as (meth) acrylate.

The monofunctional (meth)acrylates can include, for example, as substituents, (meth)acrylates having groups such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, non- ylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyl tetraphydrofurufuryl, caprolactone modified tetrahydrofurufuryl, isobornyl, dicyclopentanyl, dicyclopentenyl, dicyclopenteniloxyethyl, or the like.

The multifunctional (meth)acrylates can include, for example, di(meth)acrylates such as 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, polypropylene glycol, and di(meth) acrylates of tris(2-hydroxyethyl)isocyanurate, or the like.

In addition, they can include di(meth)acrylate of diol obtained by adding 4 mol or more of ethylene oxide or propylene oxide to 1 mol of neopentyl glycol, di(meth) acrylate of diol obtained by adding. 2 mol of ethylene oxide or propylene oxide to 1 mol of bisphenol A, di- or tri(meth) acrylate of triol obtained by adding 3 mol or more of ethylene oxide or propylene oxide to 1 mol of trimethylolpropane, di(meth)acrylate of diol obtained by adding 4 mol or more of ethylene oxide or propylene oxide to 1 mol of bisphenol A, trymethylolpropane tri(meth)acrylate, pentaerythritol tri(meth)acrylate, poly(meth)acrylate of dipentaerythritol, ethylene oxide modified phosphoric acid (meth) acrylate, ethylene oxide modified alkylate phosphoric acid (meth)acrylate, or the like.

In addition, the polymerization oligomers that can be used by mixture with the polymerization monomers can include polyester (meth)acrylate, polyether (meth)acrylate, epoxy (meth)acrylate, urethane (meth)acrylate, or the like.

Further, the radical ultraviolet curable resins are generally mixed with photo polymerization initiators. The preferred photo-polymerization initiators are the type of molecule-cleavage or hydrogen-abstraction. As such photo-polymerization initiators, the molecule-cleavage type can include, for example, benzoin isobutyl ether, 2,4-diethyl thioxanthone, 2-isopropyl thioxanthone, benzyl, 2,4,6-trimethyl-benzoyldiphenylphosphine oxide, 2-benzyl-2-dimethylamine-1-(4-morpholinophenyl)-butane-1-one, bis(2,6-dimethoxybenzoyl)-2,4,4-trimethylpentylphosphine oxide, or the like.

Further, there can be used by mixture that 1-hydroxycyclohexylphenylketone, benzoin ethyl ether, benzyldimethylketal, 2-hydroxy-2-methyl-1-phenylpropane-1-one, 1-(4-isopropylphenyl)-2-hydroxy-2-methylpropane-1-one, and 2-methyl-1-(4-methylthiophenyl)-2-morpholinopropane-1-one, or the like. The hydrogen-abstraction type can include, for example, benzophenone, 4-phenyl benzophenone, isophthalphenone, 4-benzoyl-4'-methyl-diphenylsulfide, or the like.

In addition, these photo-polymerization initiators can be used with intensifiers. The intensifiers can include, for example, trimethylamine, methyldimethanolamine, triethanolamine, p-diethyl aminoacetophenone, p-dimethylamino benzoic acid ethyl, p-dimethylamino benzoic acid isoamyl, N,N-dimethyl benzylamine, 4,4'-bis(diethylamino)benzophenone, or the like.

The cation ultraviolet curable resins can include, for example, epoxy resins including cationic polymerization type of photo-polymeriza-tion initiator. The epoxy resins can include, for example, bisphenol A-epichlorohydrin type, alicyclic epoxy, long-chain fatty aliphatic type, bromination epoxy resin, glycidyl ester type, glycidyl ether type, heterocyclic, or the like. The preferred epoxy resins contain small amount of freed chlorines and chlorides. The amount of chlorines is preferably 1 weight % or smaller, and more preferably 0.5 weight % or smaller.

The photo polymerization initiators of the cationic polymerization type can include sulfonium salts, iodonium salts, diazonium salts, or the like. The iodonium salts can include, for example, diphenyliodonium hexafluorophosphate, diphenyliodonium hexafluoroantimonate, diphenyliodonium tetrafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, or the like.

Further, there can be included that 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl) phenyliodonium tetrafluoroborate, 4-methylphenyl-4-(1-methylethyl) phenyliodonium tetrakis(pentafluorophenyl)borate, or the like.

A percentage of the cation polymerization initiators per 100 weight portion of the cation type ultraviolet curable resin is generally from 0.1 to 20 weight portion, and preferably from 0.2 to 5 weight portion. It should be noted that well-known photo intensifiers can be used by mixture so as to more effectively utilize the wavelength of near-ultraviolet area in the wavelength region of ultraviolet light source, or visible area. At that time, the photo intensifiers can include, for example, anthracene, phenothiazine, benzylmethylketal, benzophenone, acetophenone, or the like.

In addition, in order to improve various kinds of characteristics, if necessary, the ultraviolet curable resins can be further mixed with another additives such as thermal polymerization inhibition agents, antioxidants represented by hindered phenol, hindered amine, phosphate, or the like, plasticizers, and silane coupling agents represented by epoxysilane, mercaptosilane, (meth)acrylsilane, or the like.

The additives are selected to be used from which are excellent in solubility to the ultraviolet curable compounds, and do not interrupt ultraviolet ray transparency.

(Second Reflective Layer)

A preferred second reflective layer 106 has high reflectivity and high durability. In order to secure the high reflectivity, a thickness of the second reflective layer 106 is generally 40 nm or greater, preferably 50 nm or greater, and more preferably 60 nm or greater. However, in order to shorten manufacturing tact time and reduce cost, it is generally 400 nm or smaller, and more preferably 300 nm or smaller.

Preferred materials forming the second reflective layer 106 have sufficiently high reflectivity in the wavelength of reading light. For example, it is possible to singularly use metals such as Au, Al, Ag, Cu, Ti, Cr, Ni, Pt, Ta and Pd, or to use as alloyed metals. Among these, Au, Al, and Ag have high-reflectivity, thereby suitable for the materials of the second reflective layer 106. In addition, other components may be contained besides these metals are contained as the main components. Examples of the other materials can include metals such as Mg, Se, Hf, V, Nb, Ru, W, Mn, Re, Fe, Co, Rh, Ir, Cu, Zn, Cd, Ga, In, Si, Ge, Te, Pb, Po, Sn, Bi, and rear-earth metals, and semimetals.

Among these, a preferred material contains Ag as the main component, and uses it as an alloy of Ag. Preferred materials containing Ag as the main component contain from 0.1 atom % to 15 atom % of at least a kind of element selected from the group consisted of Ti, Zn, Cu, Pd, Au and rear-earth metals. In a case where two or more kinds of Ti, Zn, Cu, Pd, Au, and rear-earth metals are contained, it is preferable that each of metal be from 0.1 atom % to 15 atom %, or total of them be from 0.1 atom % to 15 atom %.

Particularly preferred alloy composition contains Ag as the main component, and contains from 0.1 atom % to 15 atom % of at least a kind of element selected from the group consisted of Ti, Zn, Cu, Pd, and Au, and if necessary, contains from 0.1 atom % to 15 atom % of at least a kind of rear-earth element. Among rear-earth metals, neodymium is particularly preferred, specifically, AgPdCu, AgCuAu, AgCuAuNd, AgCuNd, or the like.

In addition, a layer formed of only Au is suitable for the second reflective layer 106 due to its high durability (high corrosion resistance). It is also possible that, by using materials other than metals, thin film of low refractivity and thin film of high refractivity are alternately laminated to form multilayered film so as to use as the second reflective layer 106. Formation methods of the second reflective layer 106 can include, for example, a spattering method, an ion plating method, a chemical vapor deposition method, a vacuum vapor deposition method, or the like. In addition, in order to improve reflectivity, recording characteristics, adhesion, or the like, an intermediate layer and an adhesive layer formed of well-known inorganic or organic materials can be provided above and below the second reflective layer 106.

(Adhesive Layer)

A preferred adhesive layer 107 has high adhesive force and morphological stability of media is high when shrinkage at the time of curing adhesion is small. In addition, it is desirable that the adhesive layer 107 be formed of materials that do not give damages to the second reflective layer 106. However, in order to suppress the damages, a protective layer formed of well-known inorganic or organic materials can be provided therebetween. A film thickness of the adhesive layer 107 is generally 2 μm or greater, and preferably 5 μm or greater. However, it is generally preferred to be 100 μm or smaller so that an optical recording medium can be as thin as possible, and since there is a problem in that curing takes longer time, thereby causing deterioration of productivity, or the like. The adhesive layer 107 can use similar materials as the intermediate layer 104, and also use pressure-sensitive double-sided tape, or the like. The adhesive layer 107 can be formed by inserting and pressing the pressure-sensitive double-sided tape between the second reflective layer 106 and the second substrate 108.

(Second Substrate)

A preferred second substrate 108 serving as a dummy substrate has high mechanical stability and high rigidity. In addition, it is desirable to have high adhesiveness with the adhesive layer 107. Such materials can include the same materials of the first substrate 101. In addition to these, for example, Al alloy substrate such as, for example, Al—Mg alloy containing mainly Al, Mg alloy substrate such as, for example, Mg—Zn alloy containing mainly Mg, substrate containing any one of silicon, titanium, ceramics, or substrate containing in combination thereof, can be used.

From the viewpoint of high productivity of formability, cost, low hygroscopicity, morphological stability, or the like, polycarbonates are preferred. From the viewpoint of chemical resistance, low hygroscopicity, or the like, amorphous polyolefin is preferred. In addition, from the viewpoint of high-speed responsibility, glass substrates are preferred. To cause the optical recording medium 100 to have enough rigidity, a preferred second substrate 108 has a certain thickness. The thickness is preferably 0.3 mm or greater, but 3 mm or smaller, and preferably 1.5 mm or smaller.

(Other Layer)

In the optical recording medium 100 having the above-described laminated structure, an arbitral another layer can be inserted therebetween, if necessary, or can be provided in the outermost surface thereof. Specifically, a buffer layer can be provided between the first reflective layer 103 and the intermediate layer 104, the intermediate layer 104 and the second recording layer 105, the second reflective layer 106 and the adhesive layer 107, or the like. In this case, a thickness of the buffer layer is preferably 2 nm or greater, and more preferably 5 nm or greater. In a case where the thickness of the buffer layer is excessively thin, there is a possibility that the above-described penetrating phenomenon may not be sufficiently prevented. However, the preferred thickness is 2000 nm or smaller, and more preferably 500 nm or smaller. In a case where the thickness of the buffer layer is excessively thick, there is a possibility that light transmittance is deteriorated in addition to become needless to prevent the penetrating phenomenon. In addition, in a case where a layer consisted of inorganic materials, there is a problem in that productivity is deteriorated since formation of film needs a longer time, or membrane stress becomes high, thereby the thickness is preferable to be 200 nm or smaller. In particular, in a case where metals are used, since light transmittance is excessively deteriorated, the preferred thickness is 20 nm or smaller.

In addition, a protective layer can be provided for protecting the recording layer and the reflective layer. Materials for the protective layer are not limited as long as it can protect the recording layer and the reflective layer from external force. Organic materials can include thermoplastic resins, thermosetting resins, electron beam curable resins, ultraviolet curable resins, or the like. In addition, inorganic materials can include conducers such as silicon oxide, silicon nitride, and $MgF_2$, $SnO_2$.

It should be noted that the present embodiment is not intended to limit to the optical recording medium 100 shown in FIG. 1, but can be applied to an optical recording medium having an alternate configuration if the optical recording medium including a plurality of recording layers capable of recording/reading information optically.

Figure 3:
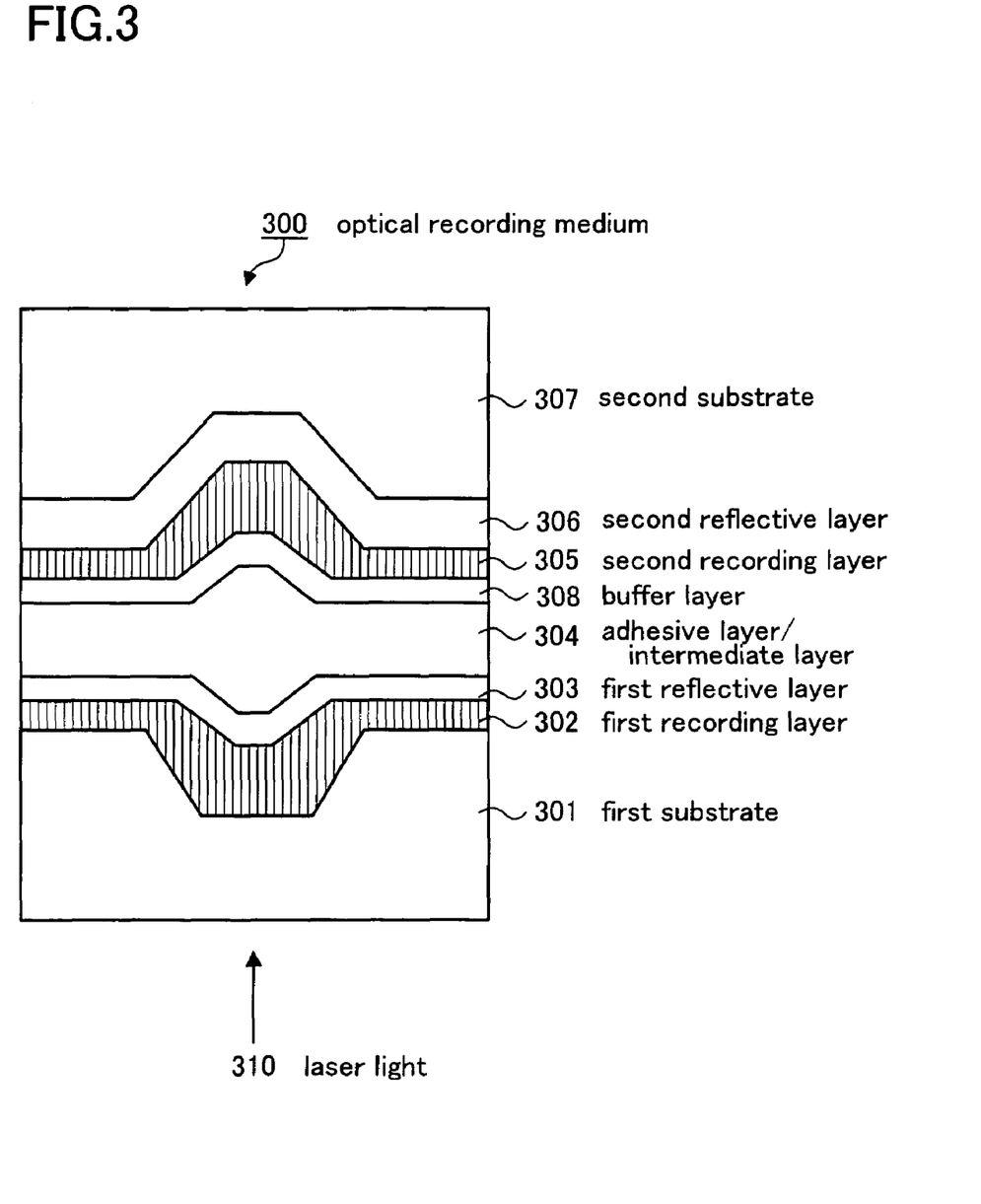
FIG. 3 is a diagram showing another example of the optical recording medium to which the present embodiment is applied.

FIG. 3 is a diagram showing another example of the optical recording medium to which the present embodiment is applied.

FIG. 3 shows an adhesive type of an optical recording medium 300 in which two sheets of substrate having recording layer via an adhesive layer are adhered. The optical recording layer 300 shown in FIG. 3 has a configuration such that a disc-shaped first substrate 301 with optical transparency having grooves, lands, and pre-pits, and a disc-shaped second substrate 307 having grooves, lands, and pre-pits are adhered via the adhesive layer 304 (intermediate layer).

On the first substrate 301, a first recording layer 302 containing dyes in which recording/reading of information is carried out by laser light 310 irradiated via the first substrate 301, and a translucent first reflective layer 303 dividing power of the laser light 310 incident from the first substrate 301 side, are sequentially laminated. In addition, on the second substrate 307, a second reflective layer 306 and a second recording layer 305 containing dyes having higher sensitivity than that of the dyes contained in the first recording layer 302, and a buffer layer 308, are laminated.

As shown in FIG. 3, the first substrate 301 and the second substrate 307, and the first recording layer 302 and the second recording layer 305 are respectively adhered via the adhesive layer (intermediate layer) 304 so as to oppose each other.

It should be noted that grooves formed on the surfaces of the first substrate 301 and the second substrate 307 with a predetermined width and depth, are formed in the same range as the range of the above-described optical recording medium 100 (FIG. 1).

(Method of Manufacturing Optical Recording Medium)

Next, one example of a method of manufacturing an optical recording medium to which the present embodiment is applied, will be described.

FIGS. 2 are diagrams illustrating a method of manufacturing an optical recording medium to which the present embodiment is applied. First, as shown FIG. 2A, a first substrate 201, on which grooves, lands, or pre-pits are formed on the surface, is manufactured by an injection molding method using stamper, or the like. Next, coating solution in which at least an organic dye is dissolved in solvent, is coated on the surface on the side having concavity and convexity portion of the first substrate 201 by a spin-coat method, or the like, and then heated (annealed) so as to remove the solvent used for the coating solution, thereby depositing the first recording layer 202. After the first recording layer 202 is deposited, a film of the translucent first reflective layer 203 is deposited on the first recording layer 202 by a spattering method, or the like, which carries out stappering or vapor deposition of Ag alloy, or the like.

Figure 2A:
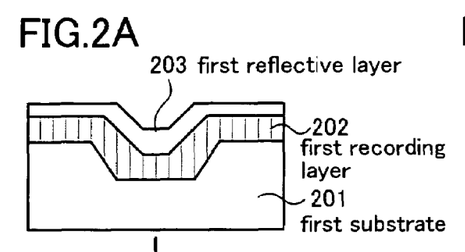
FIG. 2 are diagrams illustrating a method of manufacturing an optical recording medium to which the present embodiment is applied.
Figure 2B:
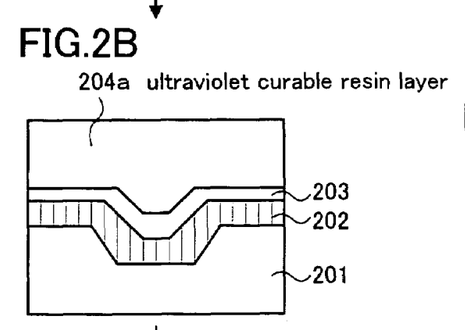
Figure 2C:
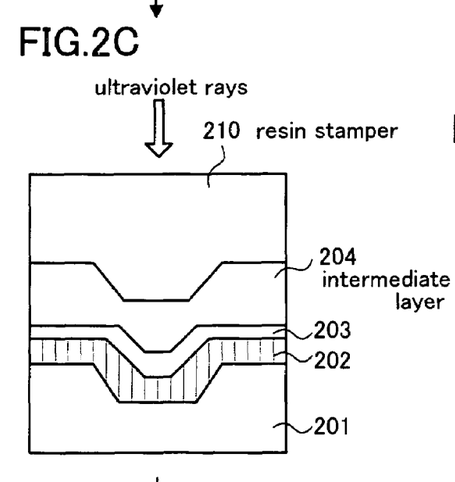

Next, as shown in FIG. 2B, an ultraviolet curable resin layer 204a is formed by entirely coating, by the spin-coat method, the surface of the first reflective layer 203. Further, as shown in FIG. 2C, the ultraviolet curable resin layer 204a is coated by the spin coating or the like, and a resin stamper 210 is mounted to transfer the concavity and convexity to the ultraviolet curable resin layer 204a. At this time, a film thickness of the ultraviolet curable resin layer 204a is adjusted so as to be within a predetermined range. In addition, in this state, the ultraviolet curable resin layer 204a is cured by irradiating ultraviolet ray from the resin stamper 210 side, or the like, and when sufficiently cured, the resin stamper 210 is delaminated so as to form the intermediate layer 204 having concavity and convexity on the surface.

It should be noted that a desired resin stamper 210 has sufficient exfoliativeness relative to resin to be the intermediate layer 204, high formability, and high morphological stability. From the viewpoint of productivity and cost, a preferred resin stamper 210 is capable of being used in a plurality of transfers. In addition, it is preferable to be capable of being recycled after use. In addition, materials of the resin stamper 210 can include, for example, an acryl resin, a methacryl resin, a polycarbonate resin, a polyolefin resin (especially, amorphous polyolefin), a polyester resin, a polystyrene resin, an epoxy resin, or the like. Among these, amorphous polyolefin is preferable from the viewpoint of high productivity of formability, or the like, cost, low hygroscopicity, morphological stability, or the like.

Figure 2D:
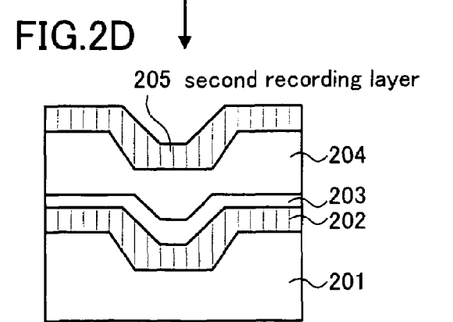

Next, as shown in FIG. 2D, the second recording layer 205 is deposited by coating the coating solution, in which the organic dyes are dissolved in the solvents, to the surface of the intermediated layer 204 by spin coating, or the like, and heating (anneal) to remove the solvents used for the coating solution.

Figure 2E:
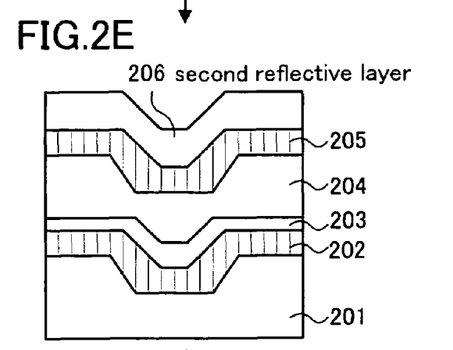
Figure 2F:
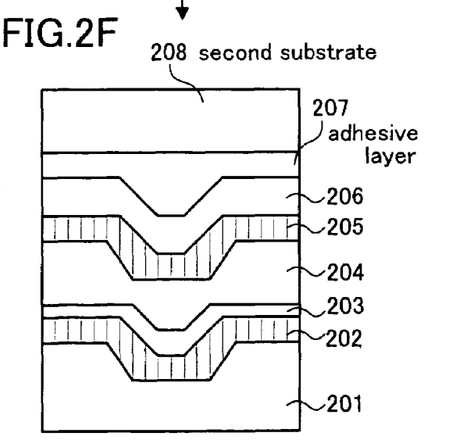

Then, as shown in FIG. 2E, the second reflective layer 206 is deposited on the second recording layer 205 by spattering or vapor-depositing Ag alloy, or the like. After that, as shown in FIG. 2F, manufacturing an optical recording medium is completed when a substrate without grooves and lands serving as the second substrate 208 obtained by injection molding of polycarbonate is adhered to the second reflective layer 206 via the adhesive layer 207.

The optical recording medium 100 to which the present embodiment is applied and the method thereof have been described above. However, the present embodiment is not intended to limit to the above aspects, but various modifications can be made. For example, the optical recording medium can have three or more recording layers. In addition, if necessary, another layer can be provided between respective layers, or as the outermost layer. Not limited to the substrate-incident type of optical discs, and but also it is applicable to the film surface incident type of optical discs that have laminated layer structure including at least a substrate, a protective layer, a second recording layer, a buffer layer, an intermediate layer, a translucent reflective film, a first recording layer, and a protective layer, and carry out recording/reading information by irradiating laser light from the protective layer side (that is, from film surface side).

EXAMPLES

Based on Examples, the present embodiment will be further described in detail. It should be noted that the present embodiment is not intended to limit to the examples as long as it is not beyond the gist of the invention.

(1) Preparation for an Optical Recording Medium

By carrying out injection molding of polycarbonate by using Ni stamper having grooves formed on a surface, three substrates having a diameter of 120 mm and a thickness of 0.57 mm, on which grooves having a pitch of 0.74 μm, a width of 0.33 μ, and a depth of 140 nm were formed, were formed.

Next, among metallized azo dyes represented by the general formula (II), octafluoropentanol solution (concentration of 1.52 weight %), of a Dye A, represented by the following formula, was dropped on each of the substrates. After spin coating was carried out, the substrates were dried for 30 minutes at the temperature of 100° C. to form a first recording layer on respective substrates. Each of the film thickness of the first recording layers was approximately 80 nm.

[Formula 4]

(Dye A)

Next, on each of the first recording layers, a translucent first reflective layer having a thickness of 17 nm was deposited by the spattering method in use of Ag alloy consisted of Ag—Bi (Bi of 1.0 atom %). Next, on this first reflective layer, ultraviolet curable resin was coated, and a concavity and convexity face of resin stamper of a pre-manufactured amorphous polyolefin resin was mounted to face to the first substrate side. After ultraviolet ray was irradiated from the resin stamper side and the ultraviolet curable resin was cured, the resin stamper was delaminated. Then, similar to the first substrate, each of the intermediate layers having a thickness of approximately 50 μm, a pitch of 0.74 μm, a width of 0.39 μm, and a depth of 170 nm on the surface thereof, was formed.

After that, among the metallized azo dyes represented by the general formula (II), the above-described Dye A, a Dye C represented by the following formula, a Dye B which is a mixture of the Dye A and the Dye C (Dye A/Dye C=60/40 weight %), octafluoropentanol solution (concentration of 1.9 weight %) of the three kinds of dyes were respectively prepared. Next, octafluoropentanol solution of these three kinds of the dyes (the Dye A, the Dye B, and the Dye C) was dropped onto each of the intermediate layers of the substrates. After spin coating was carried out, the substrates were dried for 30 minutes at the temperature of 100° C. to form three kinds of discs on which the second recording layer was formed (that is, disc 1 (Dye B), disc 2, (Dye C), and disc 3 (Dye A)). At this time, in any case of disc 1 to disc 3, the film thickness of the second recording layers was approximately 90 nm.

[Formula 5]

(Dye C)

After that, on each of the second recording layers of the three kinds of discs, the second reflective layer having a thickness of 130 nm formed of Ag alloy was deposited, and then the adhesive layer was provided on the second reflective layer by spin coating the ultraviolet curable resin. Then, a second substrate formed of polycarbonate having a diameter of 120 mm and a thickness of 0.6 mm was mounted on the adhesive layer, and was irradiated by ultraviolet ray to be cured and adhered. The three kinds of optical recording media having two recording layers (optical recording media 1 to 3) were prepared. Table 1 shows kinds of dyes used for the first and second recording layers, and kinds of the optical recording media.

TABLE 1

| Optical recording medium | First recording layer | Second recording layer |
|---|---|---|
| Optical recording medium 1 | Dye A | Dye B |
| Optical recording medium 2 | Dye A | Dye C |
| Optical recording medium 3 | Dye A | Dye A |

(2) Measurement of Optical Density

The optical density (OD) ($I_{abs}$) is obtained by the following relational expression. Chloroform solution (concentration of 5 mg/l) of each of the Dyes A to C was admitted into the cell of optical path length of 10 nm and transmitted light intensity ($I_1$) is measured in the range of the wavelength from 800 nm to 400 nm in use of an absorption spectrometer (U-3300 spectrophotometer manufactured by Hitachi, Ltd.). It should be noted that a reference is set such that chloroform is admitted into the cell.

$I_{abs} = -\log(I_1/I_0)$ (In this regard, $I_0$ is incident light intensity, $I_1$ is transmitted light intensity, and a base of logarithm is 10.)

Table 2 shows results of measurement of the optical density in the wavelength of 657 nm of the Dyes A to C. It should be noted that it was identified that magnitude correlation of the Dye A, the Dye B, and the Dye C was unchangeable in the range of the wavelength from 690 nm to 590 nm.

TABLE 2

| Dye | Optical density |
| --- | --- |
| Dye A | 0.0037 |
| Dye B | 0.0069 |
| Dye C | 0.0118 |

(3) Measurement of Optimum Recording Power

Laser light was irradiated from the first substrate side to the optical recording medium having the two recording layers in use of recording/reading evaluating machine (DDU-1000 manufactured by Pulsetec Industrial Co., Ltd.) having the wavelength of 657 nm and objective lens numerical aperture of 0.65, and 8-16 modulated EFM+signals were recorded on the first recording layer and the second recording layer changing the recordation power at linear velocity of 3.8 m/s, with a reference clock period of 38.5 ns (1/26 Mbps). Reading liner velocity was, similar to the recording liner velocity, 3.8 m/s, and jitter of the signals read by the reading power of 0.7 mW was measured so that the recording power in the proximity of the minimum jitter value is obtained as an optimum recording power.

Here, the jitter of the reading signals means that the reading signals were converted to be binalized signals by slicer after being passed through an equalizer and LPF. A standard deviation of time variation (jitter) of leading edge and trailing edge of the binalized signals relative to PLL clock was normalized by reference clock period T.

Examples 1 and 2, Comparative Example

Table 3 shows measurement results of optimum recording power and reflectivity regarding three kinds of optical recording media (optical recording media 1 to 3) having two recording layers thus pre-prepared.

layer is preferred to be set greater than optical density of a dye contained in the first recording layer. Specifically, it is understood that, in a case where a dye having the optical density of 0.005 or greater is used in the second recording layer (Examples 1 and 2), the optimum recording power of the second recording layer decreases, and sensitivity of the recording layer increases.

In contrast, it is understood that, in a case where a dye having the optical density of less than 0.005 is used in the second recording layer (Comparative Example), the optimum recording power of the second recording layer increases, and the recording sensitivity of the second recording layer is remarkably deteriorated compared with the sensitivity of the first recording layer.

Figure 4:
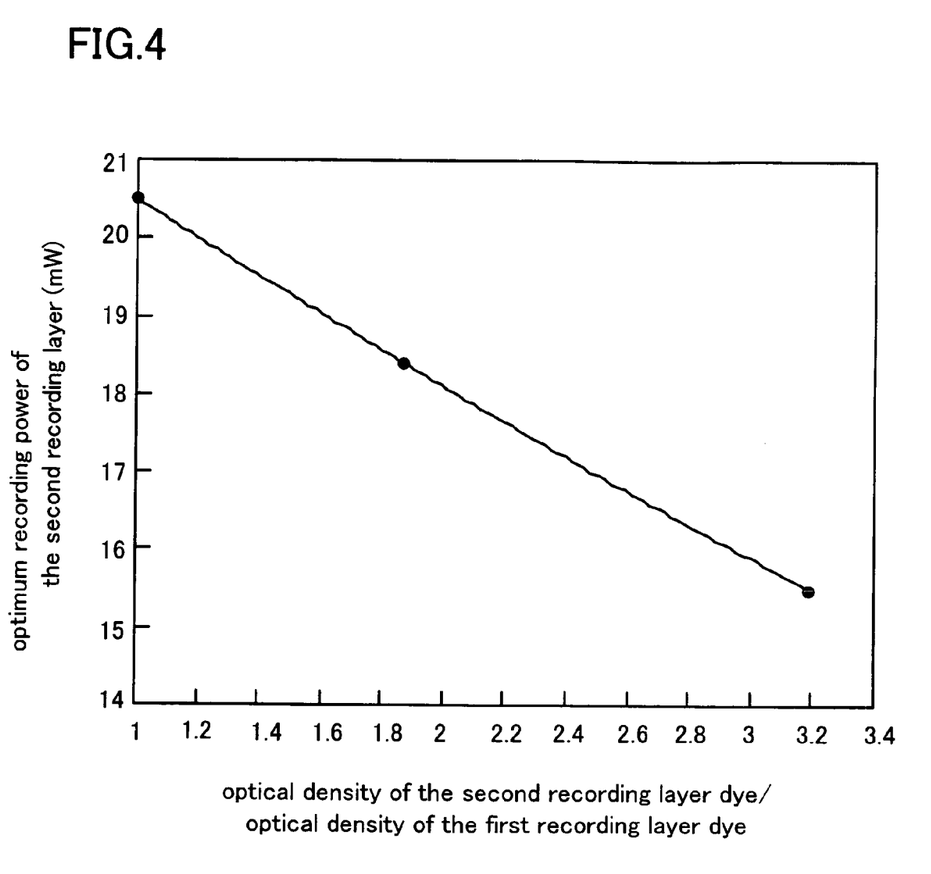
FIG. 4 is a graph showing a relation between the optimum recording power of the second recording layer in Example 1, Example 2 and Comparative Example, and (optical density of the second recording layer dye)/(optical density of the first recording layer dye).

FIG. 4 is a graph showing a relation between the optimum recording power of the second recording layer in Example 1, Example 2 and Comparative Example, and (optical density of the second recording layer dye)/(optical density of the first recording layer dye) (hereinafter it may be referred to as optical density ratio). In a case where recording is carried out at 3.8 m/s, which is almost the same recording speed as the recording speed of a 1× write DVD, if the recording power is 20.5 mW or greater, higher speed of recording may become difficult. Detailed description of reasons for this will be given later in "Experiments."

From the results shown in FIG. 4, a preferred optical density ratio is 1.05 times or greater, more preferably 1.1 times or greater, and further preferably 1.2 times or greater. Further, it is believed that an existing low-speed compliant DVD-R drive is preferred to be capable of recording by the optimum recording power of 20 mW or smaller when recording is carried out at the recording speed equivalent to 1× speed, since, in the existing low-speed compliant DVD-R drive, the upper limit of laser power is in the proximity of 23 mW on the disc surface. Therefore, it is understood that the optical density ratio is preferred to be 1.3 times or greater.

In addition, it is understood that the reflectivity of the second recording layer has a tendency to decrease as the optical density of the dye contained in the second recording layer becomes greater. This is believed that when the optical density of the dye contained in the recording layer is excessively great, securing sufficient reflectivity becomes difficult because the second recording layer excessively

TABLE 3

| | Optical recording medium | Second recording layer | | | Optimum recording power (mW) | | (Optical density of second recording layer dye)/ (Optical density of first recording layer dye) |
| --- | --- | --- | --- | --- | --- | --- | --- |
| | | Dye | Optical density | Reflectivity (%) | First recording layer | Second recording layer | |
| Example 1 | Optical recording medium 1 | Dye B | 0.0069 | 19.0 | 16.0 | 18.4 | 1.87 |
| Example 2 | Optical recording medium 2 | Dye C | 0.0118 | 18.1 | 16.0 | 15.5 | 3.19 |
| Comparative Example | Optical recording medium 3 | Dye A | 0.0037 | 20.9 | 16.0 | 20.5 | 1.0 |

It is understood from the results shown in Table 3 that, in an optical recording medium having two recording layers, optical density of a dye contained in the second recording absorbs the light. It should be noted that in order to read information by using a commercially available DVD drive, the reflectivity is generally needed to be 16% or greater, and to have a complete compatibility with a specification of a Dual Layer DVD-ROM, the reflectivity is generally needed to be 18% or greater. Therefore, it is believed that the upper limit of the optical density is 0.015 in order to secure sufficient reflectivity.

(Experiments)

With reference to the optical recording medium 1 used in Example 1, the optical recording medium 2 used in Example 2, and the optical recording medium 3 used in Comparative Example, recording was carried out under the following conditions in each of the first and second recording layers by using a recording/reading evaluating machine (ODU, NA=0.65 manufactured by Pulstec Industrial Co., Ltd.) having higher upper limit of the laser irradiation than that of the recording/reading evaluating machine used in Example 1. Recording pulse strategy is shown below.

According to the above conditions, recording is carried out in the three kinds of optical recording media, and a ratio of the recording power of the second recording layer to the recording power of the first recording layer (hereinafter, it may be referred to as recording sensitivity ratio), and a ratio of the optical density of the second recording layer dye (hereinafter, it may be referred to as the optical density of the second layer) to the optical density of the first recording layer dye (hereinafter, it may be referred to as the optical density of the first recording layer) (hereinafter, the ratio may be referred to as the optical density ratio), are shown in Table 4.

It should be noted that recording power (mW) was recording power having Asym=0.05, and recording sensitivity ratio was a ratio of the recording power (mW) of the second recording layer relative to the first recording layer.

TABLE 4

| Recording Speed | Optical recording medium | Second recording layer Dye | Second recording layer Optical density | Recording power (mW) First recording layer | Recording power (mW) Second recording layer | Modulation amplitude Second recording layer | (Optical density of second recording layer dye)/ (Optical density of first recording layer dye) | Recording sensitivity ratio (Second recording layer)/ (First recording layer) |
|---|---|---|---|---|---|---|---|---|
| 2.4× | Optical recording medium 1 | Dye B | 0.0069 | 23.2 | 23.0 | 0.69 | 1.87 | 0.991 |
|  | Optical recording medium 2 | Dye C | 0.0118 | 22.9 | 19.2 | 0.76 | 3.19 | 0.838 |
|  | Optical recording medium 3 | Dye A | 0.0037 | 23.5 | 27.2 | 0.68 | 1.0 | 1.16 |
| 4× | Optical recording medium 1 | Dye B | 0.0069 | 32.7 | 33.5 | 0.73 | 1.87 | 1.02 |
|  | Optical recording medium 2 | Dye C | 0.0118 | 33.6 | 27.3 | 0.79 | 3.19 | 0.813 |
|  | Optical recording medium 3 | Dye A | 0.0037 | 33.5 | 40.9 | 0.73 | 1.0 | 1.22 |
| 6× | Optical recording medium 1 | Dye B | 0.0069 | 46.6 | 48.0 | 0.74 | 1.87 | 1.03 |
|  | Optical recording medium 2 | Dye C | 0.0118 | 47.9 | 38.1 | 0.78 | 3.19 | 0.795 |
|  | Optical recording medium 3 | Dye A | 0.0037 | 47.4 | >55 | Not measurable | 1.0 | >1.16 |

<Recording Conditions>
(1) Recording Pulse Strategy
DVD+R version 1.2 compliant (DVD+R specification)
Tl3=1.88T, Ttop=1.75T, Tend(cm=4)=0.63T, Tend(cm≧5)=1.00T, dTle=0T, Tc=2.0T
(2) recording linear velocity (1-time velocity=1×=3.84 m/s)
2.4×=9.22 m/s, 4×=15.36 m/s, 6×=23.04 m/s
(3) reading speed
3.84 m/s <Measurement Method>

Laser power, of which asymmetry of reading signal waveform obtained by reading signals recorded under the above conditions was 5%, was set to be "recording power". Thus obtained recording power is an index that can most easily assess sensitivity (recording sensitivity) of a recording layer.

From the results shown in Table 4, in a case where the optical density ratio is 1.0, a recording sensitivity ratio by the above method becomes 1.16 (optical recording medium 3). In this case, in 6-times velocity recording, the recording power became insufficient even at 55 mW which is the upper limit of the irradiating power of a high-power laser, and satisfactory recording could not be carried out. Therefore, it can be understood that the preferred recording sensitivity ratio is below 1.16.

As described above, the recording sensitivity ratio of the second recording layer and the first recording layer in the above method, is preferably below 1.16, more preferably 1.1 or smaller, and most preferably 1.0, but may be also below 1.0.

However, in a case where the recording sensitivity difference is excessively great between the first and second recording layers, in order to obtain a favorable jitter value (the minimum jitter value), recording pulse strategy is caused to be optimized in each of the recording layers, thereby it is not preferred. With these reasons, it is believed that the recording sensitivity ratio is preferably 0.7 or greater.

From a more practical viewpoint, that is, in order to obtain the favorable jitter value, the above-described recording sensitivity ratio is preferred to be as close to 1.0 as possible.

Figure 5:
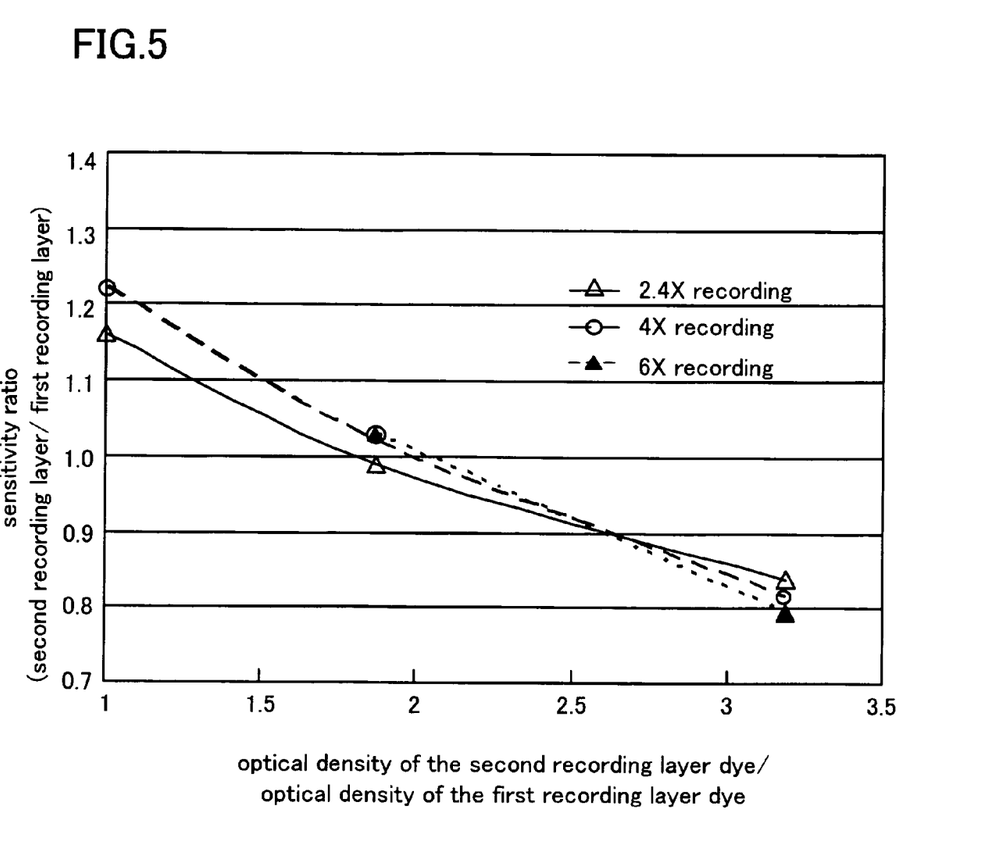
FIG. 5 is a graph showing a relation between the recording sensitivity ratio (the second recording layer/ the first recording layer) and (the optical density of the second recording layer dye)/(the optical density of the first recording layer dye) regarding the three kinds of the optical recording media shown in Table 4.

FIG. 5 is a graph showing a relation between the recording sensitivity ratio (the second recording layer/the first recording layer) and (the optical density of the second recording layer dye)/(the optical density of the first recording layer dye) regarding the three kinds of the optical recording media shown in Table 4.

As shown in FIG. 5, it is understood that, in order to obtain the above-described preferred recording sensitivity ratio, the optical density of the second recording layer dye is 1.05 times or greater, more preferably 1.1 times or greater, and further preferably 1.3 times or greater than that of the first recording layer dye.

In addition, it is understood that the recording sensitivity of the two recording layers becomes substantially equal when the optical density of the second recording layer dye is about 1.9 times as large as the optical density of the first recording layer dye.

By same reasons as described above, the above-described optical density ratio of 4 or greater is not preferred since the recording sensitivity ratio becomes below 0.7.

INDUSTRIAL APPLICABILITY

According to the present invention, recording characteristics of an optical recording medium having a plurality of dye recording layers provided on a transparent substrate, can be improved.

Although the present invention has been described with reference to certain preferred embodiments, it is apparent that modifications and variations thereof may be made by those skilled in the art without departing from the spirit and scope of the invention.

It should be noted that this application claims priority under Japanese Applications No. 2004-128002 and No. 2004-133826 filed in Japan on Apr. 23, 2004 and Apr. 28, 2004, respectively; the entire content of which is hereby incorporated by reference.

What is claimed is:

1. An optical recording medium, comprising:
a first recording layer comprising a dye and capable of recording/reading information by light; and
at least one second recording layer comprising a dye, wherein
the optical density of the dye contained in the second recording layer is greater than that of the dye contained in the first recording layer which is the closest to a side from which the light is irradiated;
the optical density of the dye contained in the second recording layer is 0.005 or greater, and 0.015 or smaller; and
the recording/reading of information on the first recording layer and the second recording layer is possible using light irradiated from one side of the optical recording medium.

2. The optical recording medium according to claim 1, wherein the optical density of the dye contained in the second recording layer is 1.3 times as large as, or 1.3 times greater than, that of the dye contained in the first recording layer.

3. The optical recording medium according to claim 1, wherein a thickness of the second recording layer is 50 nm or greater and 200 nm or smaller.

4. The optical recording medium according to claim 1, wherein the medium has a translucent reflective layer having a thickness of 5 nm or greater and 50 nm or smaller between the first recording layer and the second recording layer.

5. The optical recording medium according to claim 1, wherein a wavelength of the light is from 350 nm to 900 nm.

6. The optical recording medium according to claim 1, wherein the dye contained in the second recording layer is selected from metallized azo dyes represented by at least one of following general formula (I) and general formula (II);

wherein the rings A1 and A2 are nitrogen-containing heteroaromatic rings that can respectively have independent substituents, rings B1 and B2 are aromatic rings that can respectively have independent substituents, and X is an alkyl group with carbon numbers 1 to 6 substituted by at least two fluorine atoms.

7. The optical recording medium according to claim 1, wherein a refractive index of the dye contained in the second recording layer is 1.0 or greater.

8. The optical recording medium according to claim 1, wherein an extinction coefficient of the dye contained in the second recording layer relative to the light is 0.5 or smaller.

9. An optical recording medium comprising two recording layers, wherein
a second recording layer comprising a nickel azo dye having a greater optical density than that of a dye contained in a first recording layer in order that a ratio of (P2)/(P1) is less than 1.16, the P1 being a recording power to record information in the first recording layer provided on a side where the recording light is made incident, and the P2 being a recording power to record information in the second recording layer provided on a side distant from the side where the recording light is made incident; and
the recording/reading of information on the first recording layer and the second recording layer is possible using light irradiated from one side of the optical recording medium.

10. The optical recording medium according to claim 9, wherein the optical density of the nickel azo dye contained in the second recording layer is 1.05 times as large as, or 1.05 times greater than, that of the dyes contained in the first recording layer.

11. An optical recording medium, comprising:
a first recording layer comprising a dye and capable of recording/reading information by light; and
at least one second recording layer comprising a dye, wherein
the optical density of the dye contained in the second recording layer is greater than that of the dye contained in the first recording layer which is the closest to a side from which the light is irradiated, the recording/reading of information on the first recording layer and the second recording layer is possible using light irradiated from one side of the optical recording medium, and the dye contained in the second recording layer is selected from metallized azo dyes represented by at least one of following general formula (I) and general formula (II):

(I)

(II)

wherein the rings A1 and A2 are nitrogen-containing heteroaromatic rings that can respectively have independent substituents, rings B1 and B2 are aromatic rings that can respectively have independent substituents, and X is an alkyl group with carbon numbers 1 to 6 substituted by at least two fluorine atoms.

* * * * *